United States Patent
Caruso et al.

(10) Patent No.: US 6,363,308 B1
(45) Date of Patent: Mar. 26, 2002

(54) SATELLITE CRASH SENSOR AND METHOD WITH CONSTANT AND DYNAMIC THRESHOLDS FOR MULTI-STAGE RESTRAINT DEPLOYMENT

(75) Inventors: Christopher Michael Caruso, Kokomo, IN (US); Brian Scott Kvapil, Janesville, WI (US); Shyam V. Potti, Carmel; Lee Charles Boger, Noblesville, both of IN (US); James Hill Brogoitti; Hector Daniel Martinez, both of Oro (MX); Sheri Lynn Patterson, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/688,750

(22) Filed: Oct. 16, 2000

(51) Int. Cl.⁷ .............................................. B60R 22/00
(52) U.S. Cl. ......................... 701/45; 280/735; 180/271
(58) Field of Search .............................. 701/36, 45, 46, 701/47; 180/271, 273, 274, 282; 280/734, 735; 340/436, 903

(56) References Cited

U.S. PATENT DOCUMENTS

| | | | | |
|---|---|---|---|---|
| 6,167,335 A | * | 12/2000 | Ide et al. ....................... | 701/45 |
| 6,146,539 A1 | * | 2/2001 | Foo et al. ..................... | 280/735 |
| 6,282,473 B1 | * | 8/2001 | Steffens, Jr. .................. | 701/45 |
| 6,295,495 B1 | * | 9/2001 | Morman et al. ............... | 701/45 |
| 6,302,439 B1 | * | 10/2001 | McCurdy ..................... | 280/735 |
| 6,304,004 B1 | * | 10/2001 | Megor et al. ................. | 180/271 |

* cited by examiner

*Primary Examiner*—Richard M. Camby
(74) *Attorney, Agent, or Firm*—Robert M. Sigler

(57) ABSTRACT

A satellite crash sensor for a motor vehicle occupant restraint system that provides multi-stage deploy signaling in a manner that detects a second stage deploy crash event having an initial velocity rise followed by a loss of velocity that delays the continuation of the velocity rise. The sensor derives a velocity value from an accelerometer signal. The initiation of a possible crash event is detected and a clock count indicating a time progression into the event is initiated. A constant second stage threshold value and data defining a first stage threshold varying as function of the clock count are stored. Only for a time indicated by a first predetermined value of the clock count, a second stage datum is stored if the velocity exceeds the second stage threshold value. For a longer time determined by a second predetermined clock count, the velocity value is compared with a clock count determined value of the first stage threshold and alternatively (1) a second stage deploy signal is generated if the velocity value exceeds the value of the first stage threshold and the second stage datum is stored, (2) a first stage deploy signal is generated if the velocity value exceeds the value of the first stage threshold and the second stage datum is not stored, and (3) no deploy signal is generated if the velocity value does not exceed the first stage threshold. For at least a portion of the predetermined clock count, the clock determined value of the first threshold exceeds the second threshold value.

5 Claims, 5 Drawing Sheets

SATELLITE CRASH SENSOR AND METHOD WITH CONSTANT AND DYNAMIC THRESHOLDS FOR MULTI-STAGE RESTRAINT DEPLOYMENT

TECHNICAL FIELD

The technical field of this invention is the deployment of an occupant restraint in a motor vehicle during a vehicle crash event.

BACKGROUND OF THE INVENTION

Occupant restraint deployment controls typically provide a "smart" crash sensor, consisting of an accelerometer with very sophisticated signal processing and logic, in the passenger area of a vehicle, supplemented by one or more simple satellite crash sensors in other locations providing additional information to the process. But these controls continue to develop in capability and complexity. Two areas of development that are rapidly progressing are the use of multiple stages of restraint deployment for different levels of crash severity and increased sophistication in satellite crash sensors located outside the vehicle passenger area. These trends have led to "smart" satellite sensors having multi-stage deployment signal capability.

One of the satellite sensors for such systems is located in a frontal "crush zone" of the vehicle, where it provides an earlier look at the accelerations produced by a crash event, but is also more sensitive to misuse, rough road or deer hit events that produce initial accelerations similar to those of a crash but for which occupant restraint deployment is not desired. A sophisticated satellite sensor designed for this location might derive a velocity measure by integrating an accelerometer signal and compare the velocity measure to a dynamic or time dependent threshold, which varies, usually increasing, as a function of time relative to the beginning of a sensed possible crash event. Several such dynamic thresholds are shown in the curves of FIG. 3, in which three possible crash event velocity curves are superimposed on two velocity thresholds as a function of time. The two thresholds are shown as solid lines: curve 4 is the lower threshold testing for a lower stage deployment signal; and curve 5 is the higher threshold testing for a higher stage deployment signal. A desired trigger time DTT is shown on the time axis. A velocity curve must cross a threshold within time DTT to produce deployment, and the level of desired deployment signaled is that of the highest threshold crossed within the time. The velocity curves are broken lines. Curve 7 exceeds the lower curve 4 before time DTT but never exceeds curve 5. It thus produces a lower stage deploy signal. Curve 8 also exceeds curve 7 but not curve 8 within time DTT and thus also generates a lower stage deploy signal. But the overall behavior of curve 8 is that of a higher severity crash which would, if identified earlier, call for a high level deployment. Curve 8 "fools" the system because, although it produces an initial significant velocity, it temporarily loses velocity in the frontal "crush zone" location of the satellite sensor as the metal starts to crumple. The high velocity is postponed until after this metal crushing has occurred.

An observer will recognize that the problem described above could be avoided if curves 7 and 8 were lowered at the earliest times (the extreme left portions) so as to catch the initial "hump" of curve 8. But this would then also provide a second stage deploy signal for the event of curve 9, representing a deer hit or similar event that produces an initial high acceleration but does not accumulate much velocity and requires no deployment at all. Thus, even dynamic thresholds have their limitations in the complex task of multi-stage restraint deployment.

In addition, dynamic thresholds are not particularly efficient in their use of limited computer memory resources. A constant threshold requires memory space for only a single number, but a dynamic threshold requires memory space for a series of numbers or for the code required for storing an equation and calculating the required numbers.

SUMMARY OF THE INVENTION

The apparatus and method of this invention provide a satellite crash sensor for a motor vehicle occupant restraint system that provides multi-stage deploy signaling in a manner that detects a second stage deploy crash event having an initial velocity rise followed by a loss of velocity that delays the continuation of the velocity rise, and does so in a manner that is efficient with respect to computer memory resources.

The apparatus and method of this invention use an accelerometer to provide an acceleration signal and derive a velocity value therefrom. The initiation of a possible crash event is detected and a clock count indicating a time progression into the event is initiated. Means are provided for storing a constant second stage threshold value and data defining a first stage threshold that varies as function of the clock count. Additional means are effective only for a time indicated by a predetermined value of the clock count for comparing the velocity value with the second stage threshold and storing a second stage datum if the velocity exceeds the second stage threshold value. Finally, means are provided for comparing the velocity value with a clock count determined value of the first stage threshold and alternatively (1) generating a second stage deploy signal if the velocity value exceeds the value of the first stage threshold and the second stage datum is stored, (2) generating a first stage deploy signal if the velocity value exceeds the value of the first stage threshold and the second stage datum is not stored, and (3) generating no deploy signal if the velocity value does not exceed the first stage threshold. Preferably, for at least a portion of the predetermined clock count, the clock determined value of the first threshold exceeds the second threshold value.

DESCRIPTION OF THE PREFERRED EMBODIMENT

Figure 1:
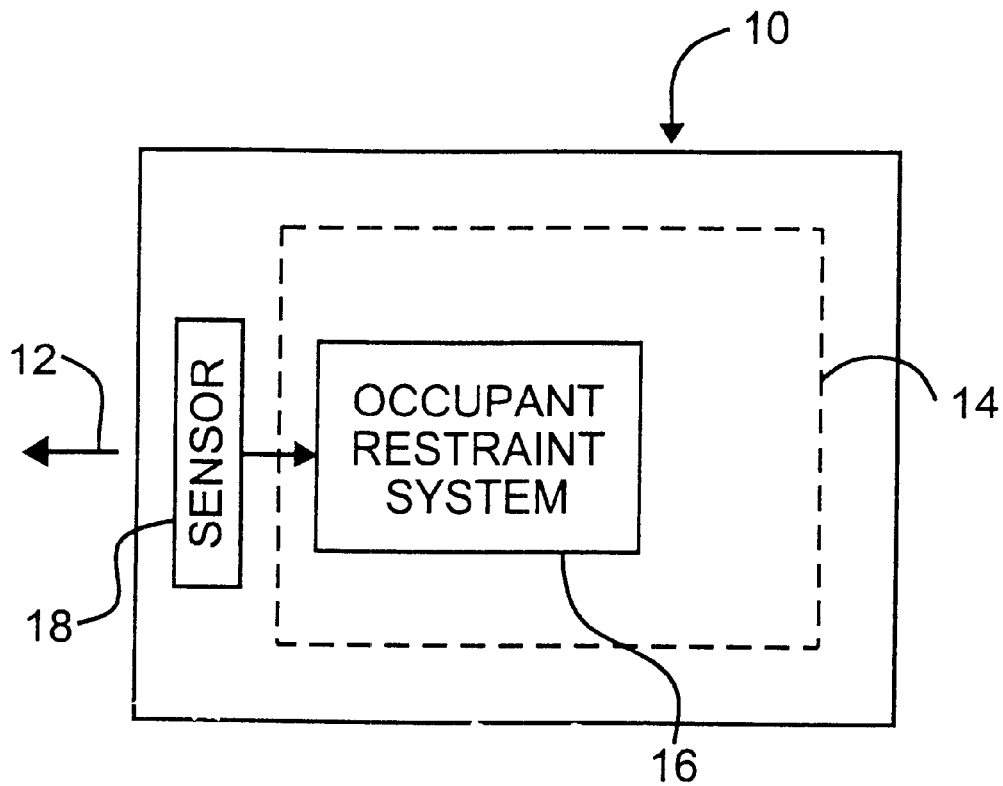
FIG. 1 shows a block diagram of a vehicle having an occupant restraint system including a crash sensor according to the invention.

Referring to FIG. 1, a motor vehicle 10 has front end indicated by directional arrow 12 and a passenger zone 14 provided with an occupant restraint system 16. Occupant restraint system 16 is preferably provided with a main accelerometer to provide a signal of vehicle acceleration and a microcomputer programmed to process and derive various vehicle dynamic measures from the accelerometer signal and compare the measures with thresholds in a timed manner to detect a vehicle crash and deploy one or more occupant restraints. Occupant restraint system 16 is assisted in this task by a satellite sensor 18 located in a crush zone 20, in this embodiment a frontal crush zone, that provides a crash signal to occupant restraint system 16. Occupant restraint system 16 is provided with at least two stages of deployment, designed for differing levels of crash severity. As described below, satellite sensor 18 is capable of providing either a first stage deploy signal or a second stage deploy signal. Occupant restraint system 16 may deploy a restraint on its own initiative or in response to a signal from satellite sensor 18; but it will not deploy the second stage of restraint without first deploying the first stage of restraint.

Figure 2:
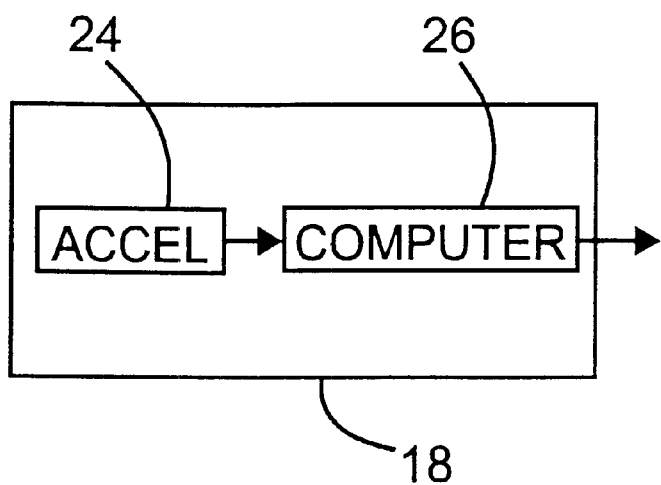
FIG. 2 shows a block diagram of a satellite sensor according to the invention for use in the occupant restraint system of FIG. 1.
Figure 4:
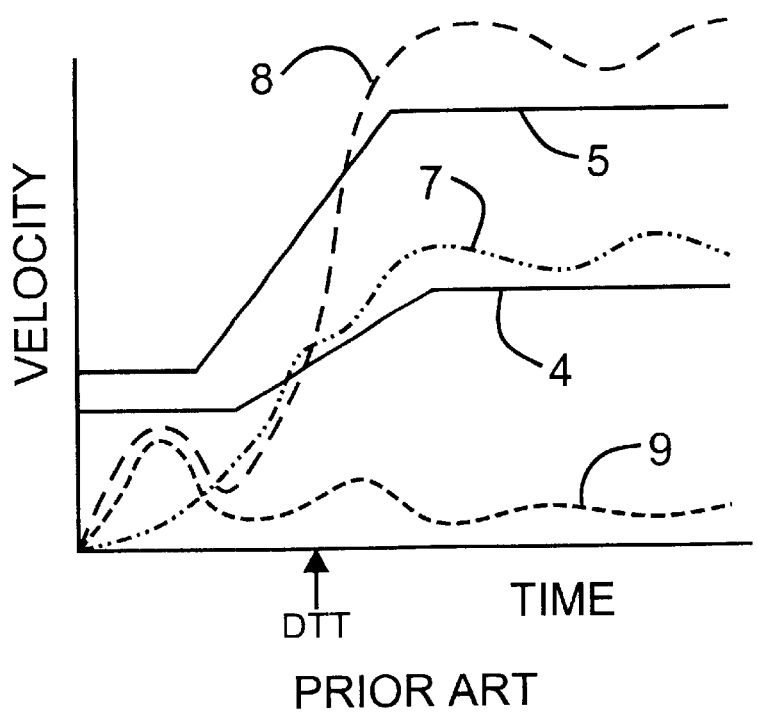
FIG. 4 shows a set of velocity curves superimposed on a prior art arrangement of two dynamic thresholds in the generation of multi-stage restraint deploy signals.
Figure 5:
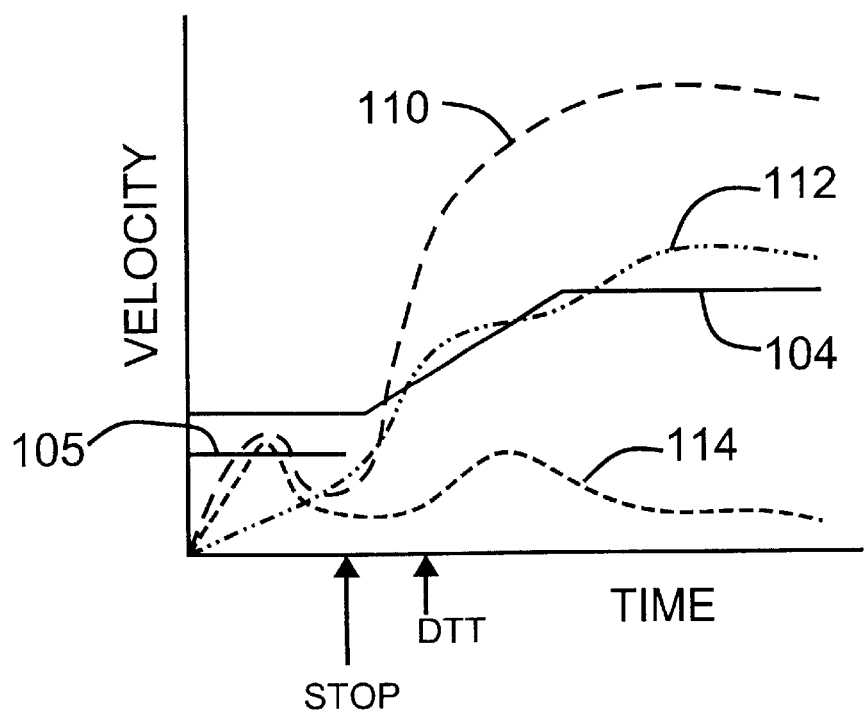
FIG. 5 shows a set of velocity curves superimposed on first and second stage thresholds in the generation of multi-stage restraint deploy signals in the crash sensor of this invention.

FIG. 2 shows a block diagram of satellite sensor 18. An accelerometer 24 is positioned to detect longitudinal accelerations of the vehicle and provide an output signal to a microcomputer 26, which processes the signals and provides a first stage or second stage deploy signal to the computer in the occupant restraint system 16. Satellite sensor 18 basically compares a velocity signal derived from the output of accelerometer 24 with two thresholds, as seen in FIG. 5. Curve 104 is the first stage threshold, a standard dynamic threshold varying with time into the possible crash event, as indicated by a software embodied clock. In this embodiment, curve 104 is shown as essentially identical to prior art curve 4 of FIG. 4; but the second stage threshold 105 is very different from curve 5 of FIG. 4. Curve 105 is a constant threshold with the characteristic that it only exists for a predetermined time STOP into the possible crash event. In addition, this constant threshold has a value that is lower than that of first stage threshold 104 for at least a portion of its duration. In this embodiment, all of it is lower; but it could start higher and be crossed by the rising portion of curve 104 prior to time DTT. The purpose of the second stage threshold is to allow sensing of a velocity at a very early time in a possible crash event that is consistent with a second stage deploy crash event. At this early time in the development of the possible crash event, the presence of such a velocity cannot yet be trusted to determine a deploy signal, but it is stored in memory as an indication that such an initial high velocity did occur. If the program later determines that a first stage deployment is required, this early indication of high velocity will be accepted as a true indication of a second stage deploy crash event.

Figure 3A:
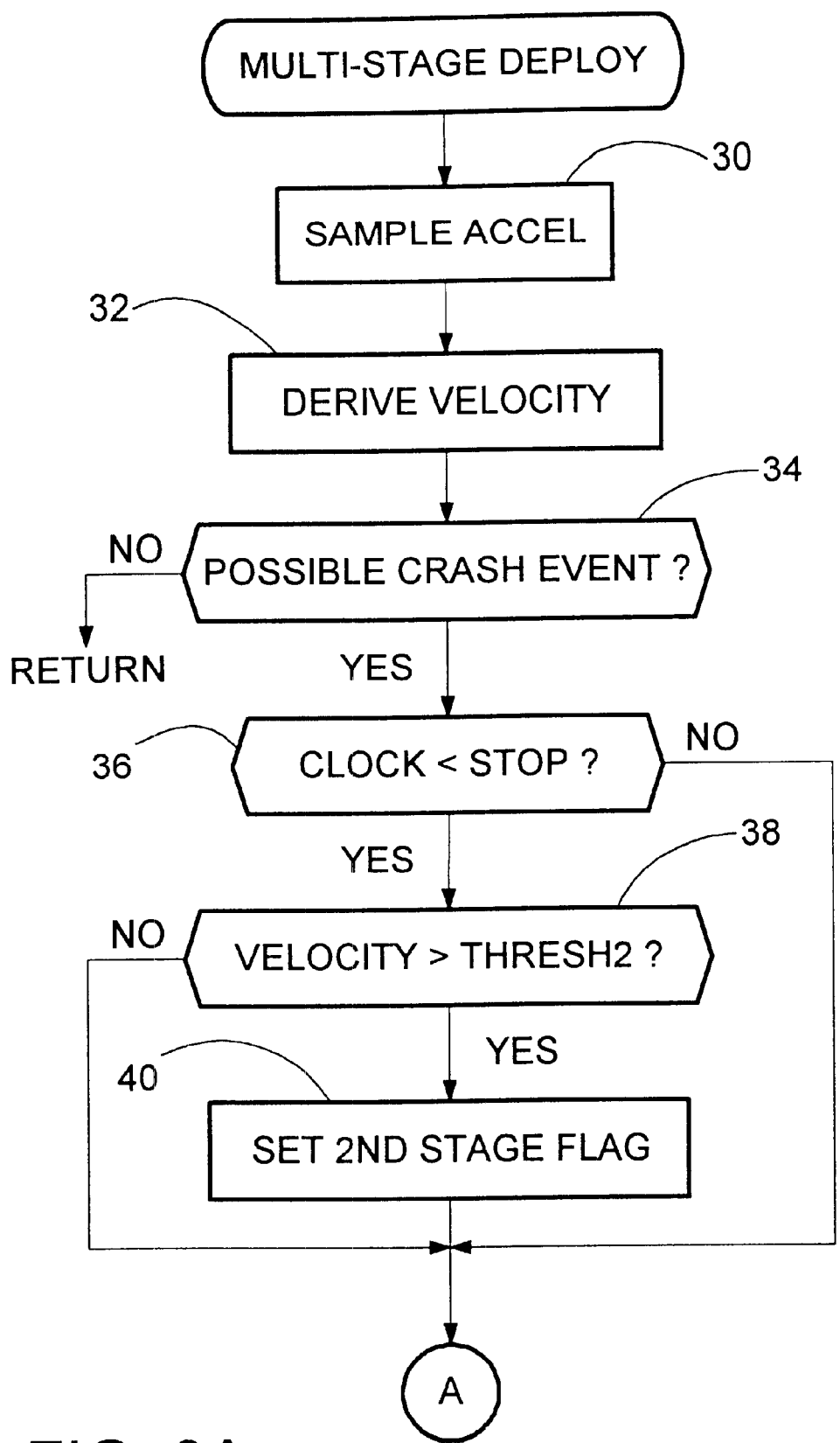
FIGS. 3A and 3B show a flow chart illustrating the operation of the crash sensor of FIG. 2.
Figure 3B:
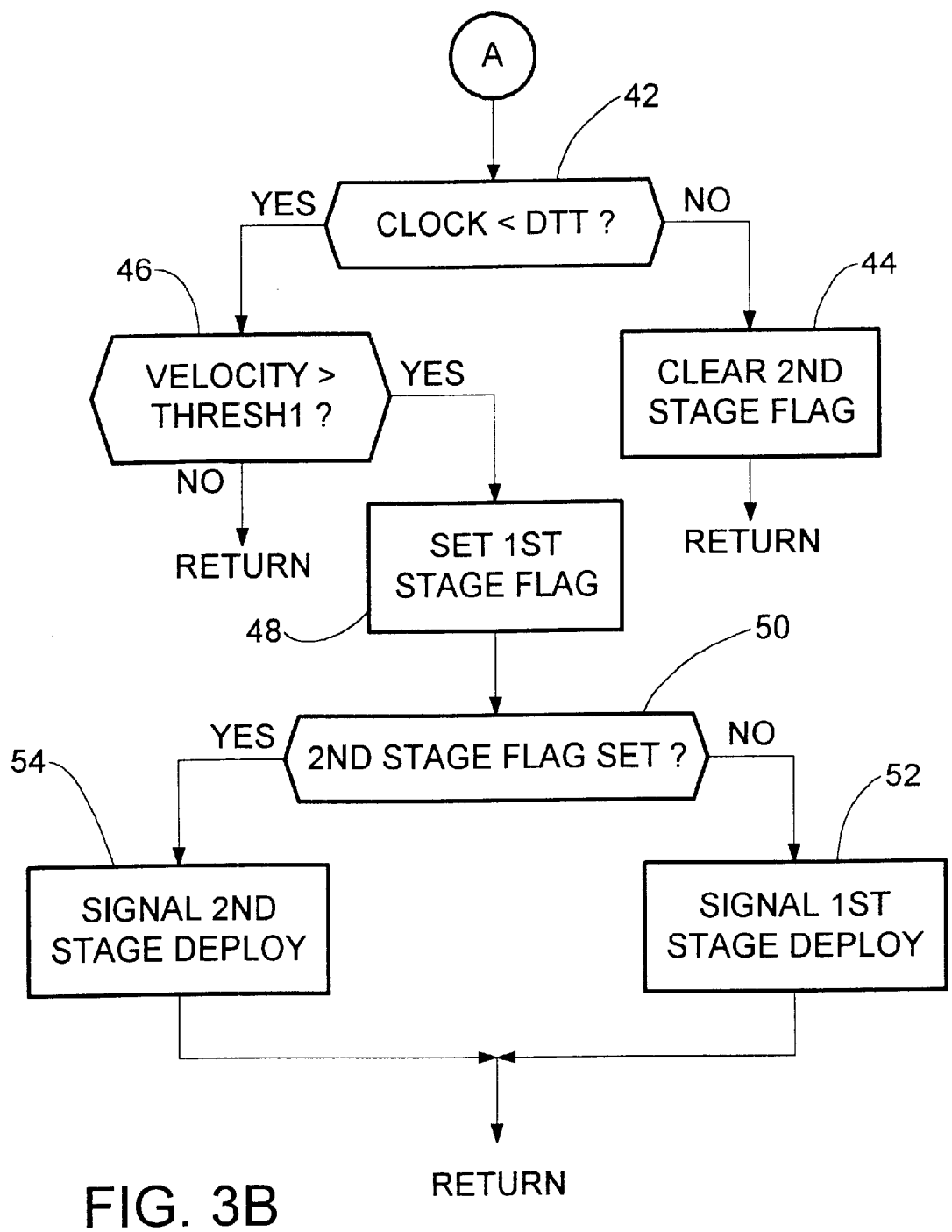

The way this is accomplished in this embodiment is shown in the flow chart of FIGS. 3A and 3B, which describe a subroutine of a program in microcomputer 26 of sensor 18 for generating first or second stage deploy signals and providing them to the computer of restraint system 16. Referring to FIG. 3A, subroutine MULTI-STAGE DEPLOY begins by sampling a low pass filtered acceleration signal from accelerometer 24 to provide a value ACCEL at step 30. At step 32, a VELOCITY value is derived from the acceleration value ACCEL, such as by integration. The subroutine next checks in step 34 to see if a possible crash event is in progress, as indicated by a crash event flag. Such a flag may be set by another part of the program by means known in the art, such as by detecting an acceleration value greater than 1.5 to 2 g's, which is large enough to ensure that the acceleration was not produced by vehicle braking. If no possible crash event is in progress, the subroutine is exited from step 34; if a possible crash event is in progress, the subroutine next checks a CLOCK count at step 36 to determine if the time from the beginning of the possible crash event is less than the time STOP which marks the end of the second stage threshold. The CLOCK count is a number stored in memory that is initialized at zero and incremented by the computer during a possible crash event in a different subroutine. Such software clocks are known in the art; but one designed particularly for a satellite sensor in a front crush zone of a motor vehicle is described in U.S. Patent Application DP-303233, Crush Space Crash Sensor for Motor Vehicle Occupant Restraint Deployment Control, filed by Christopher M. Caruso et al on Oct. 16, 2000, assigned to the same assignee as this application and incorporated herein by reference. If the time is indicated to be past time STOP, steps 38 and 40 of the subroutine are skipped.

If the time of the possible crash event, indicated by CLOCK, is within the duration STOP of the second stage threshold, VELOCITY is compared at step 38 to the second stage threshold value THRESH2, which is stored in memory. If it exceeds THRESH2, a SECOND STAGE FLAG is set at step 40. If not, step 40 is skipped.

Referring now to FIG. 3B, CLOCK is now compared at step 42 to the desired trigger time DTT. If it is not less than this time, it is too late to deploy a restraint in this possible crash event. In this case, the 2ND STAGE FLAG is cleared, and the subroutine is exited. But if the time of the possible crash event is still within time DTT, VELOCITY is compared at step 46 to the current value of a dynamic first stage threshold THRESH1. If it does not exceed this threshold, the subroutine is exited. But if it does exceed THRESH1, a FIRST STAGE DEPLOY FLAG is set. The SECOND STAGE DEPLOY FLAG is then checked at step 48. If it is not set, a FIRST STAGE DEPLOY signal is output to the main computer of restraint system 18 at step 52. But if it is set, a SECOND STAGE DEPLOY signal is output to the main computer of restraint system 16 at step 54.

The result of the operation of the invention as described above is described with reference to the curves of FIG. 5, in which the dynamic first stage threshold THRESH1 is shown as curve 104 and the constant second stage threshold THRESH2 is shown as curve 105. It can be seen that the latter curve 105 is shortened, stopping at time STOP. It is not used after this time. It should be noted that the time axis of these curves is actually measured in counts of the clock. In some embodiments, the clock can be counted backward at times by the clock subroutine to shift the apparent initiation time of the possible crash event.

Curve 110 shows a possible crash event with an initial increase in velocity, followed by a loss of velocity, before resuming the velocity rise. The initial increase is sufficient to exceed the second stage threshold of curve 105 and set the second stage flag, although it does not at that time exceed the first stage threshold of curve 104. But before time DTT it does reach the first stage threshold curve 104; and the subroutine thus provides a second stage deploy signal.

Curve 112 shows a possible crash event which does not exceed the second stage curve 105 before time STOP, so no second stage flag is set. It does, however, eventually exceed the first stage curve 104 before time DTT; and a first stage deploy signal is thus generated.

Curve 114 shows a possible crash event producing an initial velocity rise sufficient to exceed the second stage threshold curve 105 before time STOP and thus set the second stage flag. But the velocity drops and never recovers enough to exceed the first stage curve 104. Thus, the event is considered not to be a crash requiring a deployment and no deploy signal is generated. When the clock reaches count TIME, the second stage flag will be cleared to ready the system for the next possible crash event.

Figure 6:
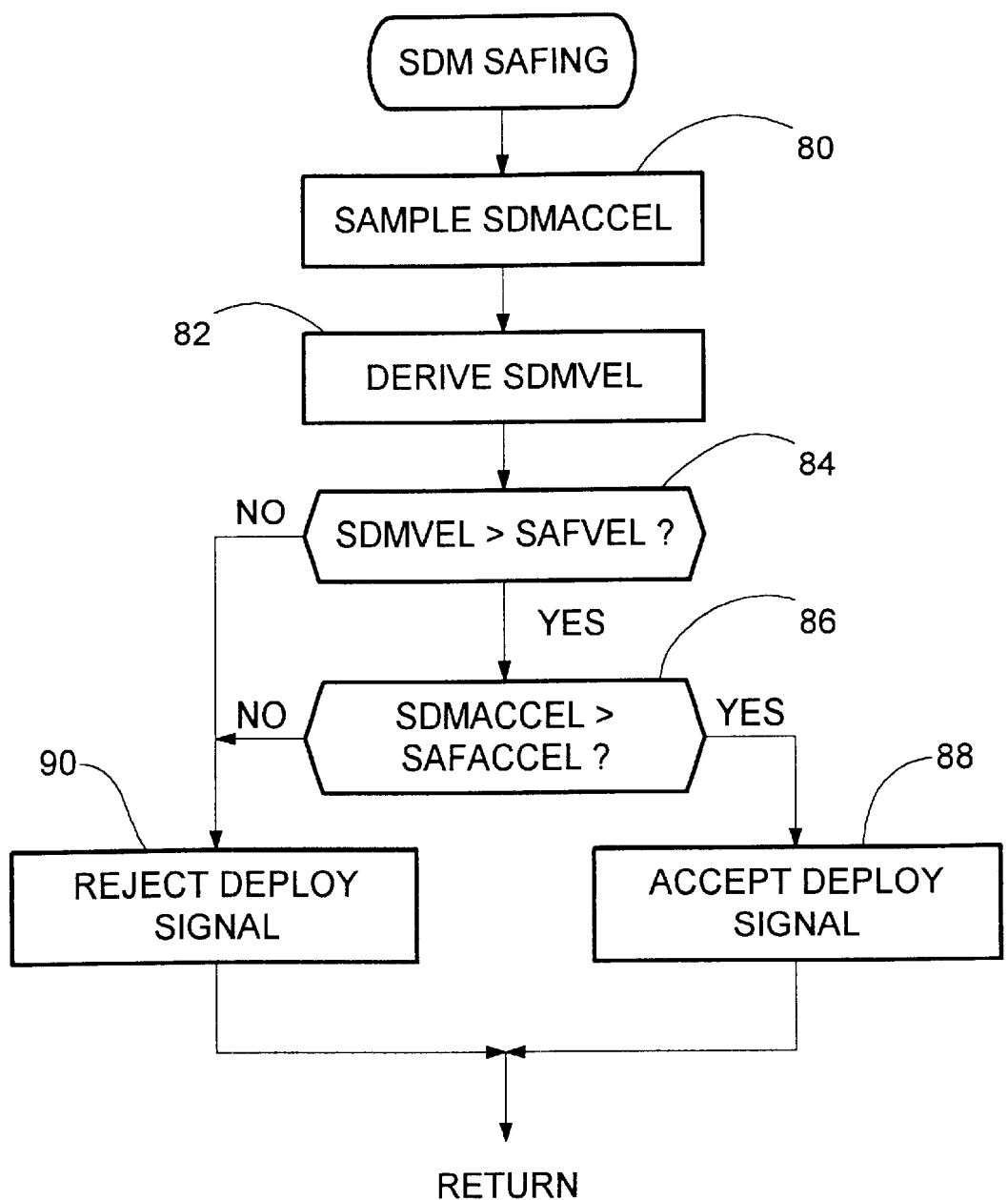
FIG. 6 is a flow chart illustrating a safing function in the main computer that receives the multi-stage restraint deploy signals from the crash sensor of this invention.

Preferably, the main computer SDM of restraint system 16 provides a safing function for any first stage or second stage deploy signal received from satellite sensor 18. The purpose of this safing function is to use other information available to the main computer to determine whether there is a strong likelihood that the received deploy signal is not reliable. This safing function is basically an AND logic function of velocity and acceleration which is described with reference to the flow chart of FIG. 6. Subroutine SAFING begins at step 80 by low pass filtering and sampling its own accelerometer output to provide its own acceleration signal SDMACCEL. At step 82, the subroutine derives a velocity value SDMVEL from the acceleration signal, such as by time integration.

The subroutine then compares the velocity value SDM-VEL with a safing threshold SAFVEL at step 84. Safing threshold SAFVEL is set low enough to be exceeded by velocities produced by events producing accelerations that continue for a long time and accumulate to build up the velocity level. These include, of course, crash events, but also include sustained driving on rough roads, wherein continued shocks to the vehicle structure through the suspension and chassis produce repeated accelerations that build up in such a way. It is set high enough, however, not to be exceeded by velocities due to single large accelerations, such as hammer blows, deer hits, etc. Such events produce a quick rise in velocity due to the single big acceleration but then quickly level off and/or recede.

If SDMVEL exceeds threshold SAFVEL, the subroutine proceeds at step 86 to compare acceleration value SDMACCEL with a safing threshold SAFACCEL. Threshold SAFACCEL is chosen to be exceeded by high accelerations; but those high accelerations produced by non-crash events tend to be early and short lived. In combination, the velocity threshold tends to be exceeded in non-crash events only by those that build up velocity slowly over time, while the acceleration threshold tends to be exceeded in non-crash events only by those that produce sharp, early acceleration peaks. At this point in the subroutine, if SDMACCEL exceeds threshold SAFACCEL, both thresholds have simultaneously been exceeded by the same event; and the signal from satellite sensor 18 that deployment is required is believable. Thus, the deploy signal is accepted at step 88. If either SDMVEL or SDMACCEL fails to exceed its threshold, the odds are very good that the event is not a crash event; and the deploy signal is rejected at step 90. The logical AND combination of the separate velocity and acceleration conditions by the passenger area accelerometer and main computer provides added immunity against erroneous signals from malfunctioning satellite sensors.

What is claimed is:

1. A satellite crash sensor for a motor vehicle occupant restraint system, the sensor comprising:

an accelerometer for providing an acceleration signal;

means for detecting the initiation of a possible crash event and initiating a clock count indicating a time progression into the event;

means for storing a constant second stage threshold value and data defining a first stage threshold that varies as function of the clock count;

means, effective only for a time indicated by a predetermined value of the clock count, for comparing the velocity value with the second stage threshold and storing a second stage datum if the velocity exceeds the second stage threshold value;

means for comparing the velocity value with a clock count determined value of the first stage threshold and alternatively:
(1) generating a second stage deploy signal if the velocity value exceeds the value of the first stage threshold and the second stage datum is stored,
(2) generating a first stage deploy signal if the velocity value exceeds the value of the first stage threshold and the second stage datum is not stored, and
(3) generating no deploy signal if the velocity value does not exceed the first stage threshold.

2. The sensor of claim 1 in which, for at least a portion of the predetermined clock count, the clock determined value of the first threshold exceeds the second threshold value.

3. Method of sensing a vehicle crash and signaling desired deployment of an occupant restraint, comprising the steps:

an accelerometer for providing an acceleration signal;

detecting the initiation of a possible crash event and initiating a clock count indicating a time progression into the event;

storing a constant second stage threshold value and data defining a first stage threshold that varies as function of the clock count;

only for a time indicated by a predetermined value of the clock count, comparing the velocity value with the second stage threshold and storing a second stage datum if the velocity exceeds the second stage threshold value;

comparing the velocity value with a clock count determined value of the first stage threshold and alternatively:
(1) generating a second stage deploy signal if the velocity value exceeds the value of the first stage threshold and the second stage datum is stored,
(2) generating a first stage deploy signal if the velocity value exceeds the value of the first stage threshold and the second stage datum is not stored, and
(3) generating no deploy signal if the velocity value does not exceed the first stage threshold.

4. Method according to claim 1 in which, for at least a portion of the predetermined clock count, the clock determined value of the first threshold exceeds the second threshold value.

5. An occupant restraint deployment system comprising:

a first crash sensor in a passenger area of the vehicle including an first accelerometer;

a second crash sensor in a front crush zone of the vehicle including a second accelerometer;

means in the second crash sensor responsive to the second accelerometer to provide a restraint deploy signal to the first crash sensor;

means in the first crash sensor for receiving the deploy signal and accepting the deploy signal as valid only if a sampled output of the first accelerometer exceeds a first threshold and a velocity value derived from the sampled output of the first accelerometer exceeds a second threshold.

* * * * *